US005320507A

United States Patent [19]

Monnier et al.

[11] Patent Number: 5,320,507

[45] Date of Patent: Jun. 14, 1994

[54] SCROLL MACHINE WITH REVERSE ROTATION PROTECTION

[75] Inventors: Kenneth J. Monnier; Francis M. Simpson, both of Sidney, Ohio

[73] Assignee: Copeland Corporation, Sidney, Ohio

[21] Appl. No.: 988,238

[22] Filed: Dec. 9, 1992

Related U.S. Application Data

[63] Continuation-in-part of Ser. No. 778,019, Oct. 17, 1991, abandoned.

[51] Int. Cl.[5] ........................ F04C 18/04; F04C 29/02; F16D 57/02; F16D 67/02

[52] U.S. Cl. ........................ 418/55.6; 418/69; 418/94; 418/181; 188/290; 417/313; 192/4 B

[58] Field of Search .................. 418/55.6, 69, 94, 181; 188/290, 291, 296; 417/313, 319; 184/6, 18; 192/4 B, 12 A

[56] References Cited

U.S. PATENT DOCUMENTS

| | | | |
|---|---|---|---|
| 1,956,188 | 4/1934 | Black | 188/291 |
| 1,992,912 | 2/1935 | de la Mater | 188/291 |
| 2,922,378 | 1/1960 | Pabst . | |
| 3,509,743 | 5/1970 | Johnson . | |
| 3,918,830 | 11/1975 | Schneider | 417/424 |
| 4,696,630 | 9/1987 | Sakata et al. | 418/57 |
| 4,697,673 | 10/1987 | Omata | 188/290 |
| 4,820,130 | 4/1989 | Eber et al. | 417/32 |
| 4,836,347 | 6/1989 | Johnson et al. | 192/45 |
| 4,998,864 | 3/1991 | Muir | 417/319 |

FOREIGN PATENT DOCUMENTS

| | | | |
|---|---|---|---|
| 6140481 | 2/1986 | Japan | 418/55.6 |
| 63248990 | 10/1988 | Japan . | |
| 4-8794 | 1/1992 | Japan . | |

*Primary Examiner*—John J. Vrablik

*Attorney, Agent, or Firm*—Harness, Dickey & Pierce

[57] ABSTRACT

A scroll compressor has a fluid brake for resisting and impeding objectionable reverse movement of the orbiting scroll member. The brake includes a one-way clutch interconnecting a drive shaft and a paddle disposed in the compressor oil sump, and optionally a rotor shield for controlling oil flow around the lower end of the motor rotor. A two piece paddle has a rotatable paddle having blades to impart angular momentum to the lubricating oil and a stationary housing having vanes to resist the angular momentum imparted to the lubricating oil by the blades of the rotatable housing.

31 Claims, 7 Drawing Sheets

SCROLL MACHINE WITH REVERSE ROTATION PROTECTION

CROSS REFERENCE TO RELATED APPLICATIONS

This application is a continuation-in-part of U.S. Ser. No. 07/778,019, filed Oct. 17, 1991, entitled "Scroll Machine with Reverse Rotation Protection", abandoned.

BACKGROUND AND SUMMARY OF THE INVENTION

The present invention relates generally to scroll type compressors and more specifically to scroll type compressors incorporating a fluid brake operative to resist and impede reverse movement of the orbiting scroll member.

Scroll type machines are becoming more and more popular for use as compressors in both refrigeration as well as air conditioning applications due primarily to their capability for extremely efficient operation. Generally, these machines incorporate a pair of intermeshed spiral wraps, one of which is caused to orbit relative to the other so as to define one or more moving chambers which progressively decrease in size as they travel from an outer suction port toward a center discharge port. An electric motor is provided which operates to drive the orbiting scroll member via a suitable drive shaft affixed to the motor rotor. In a hermetic compressor, the bottom of the hermetic shell normally contains an oil sump for lubricating and cooling purposes.

Because scroll compressors depend upon a seal created between opposed flank surfaces of the wraps to define successive chambers for compression, suction and discharge valves are generally not required. However, when such compressors are shut down, either intentionally as a result of the demand being satisfied or unintentionally as a result of a power interruption or other problem, there is a strong tendency for the gas in the pressurized chambers and/or backflow of compressed gas from the discharge chamber to effect a reverse orbital movement of the orbiting scroll member and associated drive shaft. This reverse movement often generates objectionable noise or rumble. Further, in machines employing a single phase drive motor, it is possible for the compressor to begin running in the reverse direction should a momentary power failure be experienced. This reverse operation may result in overheating of the compressor and/or other damage to the apparatus. Additionally, in some situations, such as a blocked condenser fan, it is possible for the discharge pressure to increase sufficiently to stall the drive motor and effect a reverse rotation thereof. As the orbiting scroll rotates in the reverse direction, the discharge pressure will decrease to a point where the motor again is able to overcome this pressure head and rotate the scroll member in the "forward" direction. However, the discharge pressure will now increase to a point where the cycle is repeated. Such cycling may also result in damage to the compressor and/or associated apparatus.

The present invention overcomes these problems by incorporating one-way drive means, such as a one-way clutch, coupled between the drive shaft and a paddle disposed in the compressor oil sump. When the drive shaft is rotating in the desired direction the clutch is inoperative to drive the paddle, but when rotation reverses, the drive shaft rotates the paddle in the sump so that it acts like a fluid brake to resist and impede movement of the orbiting scroll member in a reverse direction, thereby eliminating the objectionable noise generated upon shut down of the compressor. Further, this fluid brake operates to resist damage to the motor and/or compressor resulting from a reversing of single phase motors as well as resisting the cyclical reversing resulting from a blocked or failed condenser fan. The brake is passive in that it does not create any load during normal operation of the compressor.

The present invention is an improvement over the concept disclosed in U.S. Pat. No. 4,998,864, the disclosure of which is hereby incorporated herein by reference, wherein the drive shaft is connected to a rigid structure by a one-way clutch to prevent reverse rotation. Braking with the present design is much gentler, thereby significantly increasing the life of the one-way clutch mechanism.

Several embodiments of the novel anti-reverse rotation mechanism are shown including a two bladed paddle, a three bladed paddle and two versions of two piece paddles. The two and three bladed paddles impart angular momentum into the lubricating oil as they attempt to displace the oil. The two piece designs of paddles provide a rotating paddle to impart angular momentum to the lubricating oil and a stationary housing which resists the movement or displacement of the lubricating oil. The resistance offered by the stationary housing provides a higher dampening of the reverse rotation. In addition, there are illustrated versions of the apparatus which also incorporate an integral circular rotor shield of the type generally disclosed in U.S. Pat. No. 5,064,356, the disclosure of which is hereby incorporated herein by reference. Such a shield is useful in reducing the oil level in the area surrounding the rotating motor rotor during operation. In order to insure that sufficient lubricating oil is contained within the sump to assure adequate lubrication and/or cooling of the moving parts while also minimizing the overall height of the housing, it is sometimes necessary that the oil level extend above the rotating lower end of the rotor. However, the relatively high viscosity of the oil as compared to refrigerant gas creates an increased drag on rotation of the rotor resulting in increased power consumption. This problem is further aggravated in scroll compressors because they typically employ a counterweight secured to the lower end of the rotor. The present shield incorporates a generally flat circular disk or flange positioned in close proximity to the lower end of the rotor which serves to reduce return flow of oil to the area of the rotating rotor and/or counterweight but still enables some circulation thereof, which thereby increases the circulation of oil across the adjacent motor stator end turns. In operation, it has been found that this improved shield has resulted in improved cooling of the stator end turns without any substantial effect on the overall operating efficiency of the compressor.

Additional advantages and features of the present invention will become apparent from the subsequent description and the appended claims taken in conjunction with the accompanying drawings.

DESCRIPTION OF THE PREFERRED EMBODIMENT

Figure 1:
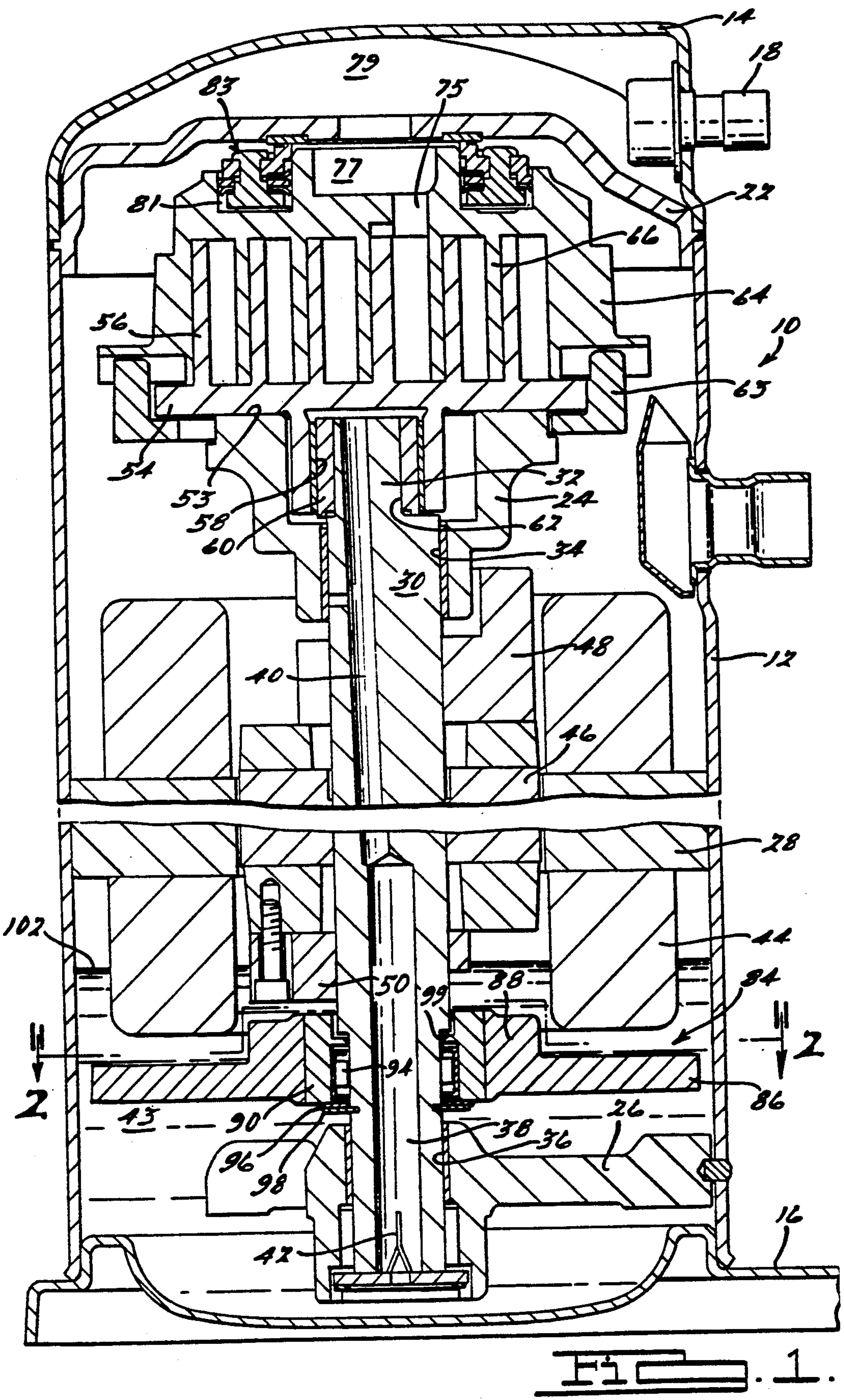
FIG. 1 is a vertical sectional view through the center of a scroll type refrigeration compressor incorporating a fluid brake in accordance with the present invention.
Figure 2:
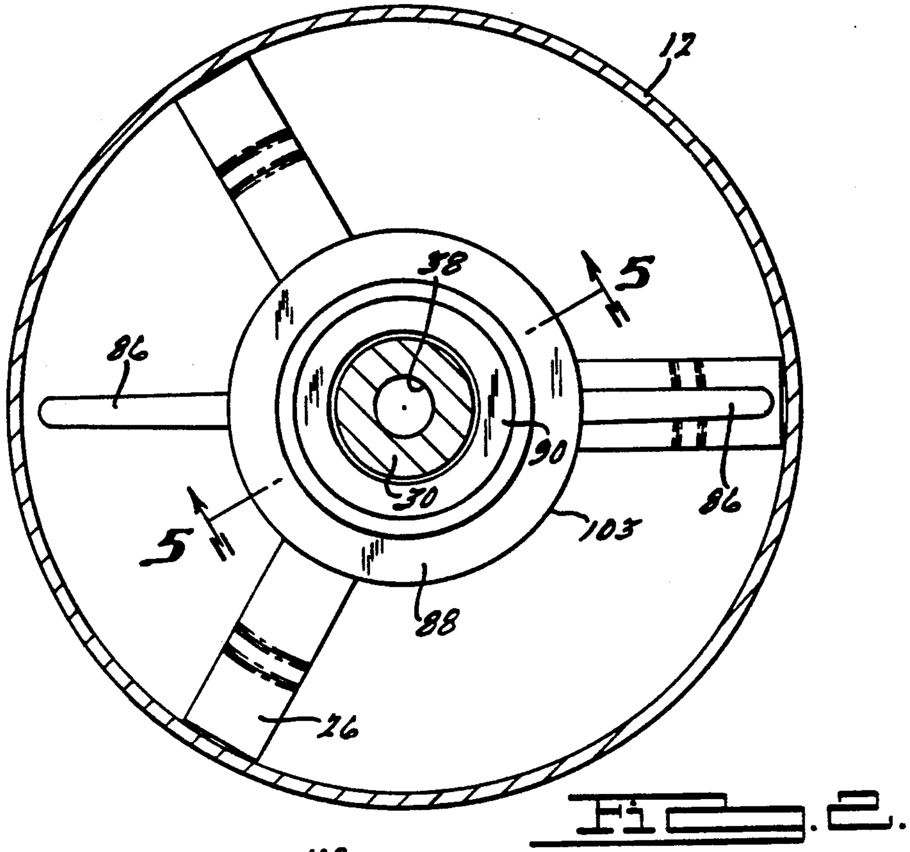
FIG. 2 is a horizontal sectional view taken generally along line 2—2 in FIG. 1.

Referring now to the drawings and in particular to FIG. 1, a compressor 10 is shown which comprises a generally cylindrical hermetic shell 12 having welded at the upper end thereof a cap 14 and at the lower end thereof a base 16 having a plurality of mounting feet (not shown) integrally formed therewith. Cap 14 is provided with a refrigerant discharge fitting 18 which may have the usual discharge valve therein (not shown). Other major elements affixed to the shell include a transversely extending partition 22 which is welded about its periphery at the same point that cap 14 is welded to shell 12, a main bearing housing 24 which is suitably secured to shell 12 and a lower bearing housing 26 also having a plurality of radially outwardly extending legs each of which is also suitably secured to shell 12. A motor stator 28 which is generally square in cross-section but with the corners rounded off is press fitted into shell 12. The flats between the rounded corners on the stator provide passageways between the stator and shell, which facilitate the return flow of lubricant from the top of the shell to the bottom.

A drive shaft or crankshaft 30 having an eccentric crank pin 32 at the upper end thereof is rotatably journaled in a bearing 34 in main bearing housing 24 and a second bearing 36 in lower bearing housing 26. Crankshaft 30 has at the lower end a relatively large diameter concentric bore 38 which communicates with a radially outwardly inclined smaller diameter bore 40 extending upwardly therefrom to the top of crankshaft 30. Disposed within bore 38 is a stirrer 42. The lower portion of the interior shell 12 defines an oil sump 43 which is filled with lubricating oil to a level slightly above the lower end of rotor 46, and bore 38 acts as a pump to pump lubricating fluid up the crankshaft 30 and into passageway 40 and ultimately to all of the various portions of the compressor which require lubrication.

Crankshaft 30 is rotatively driven by an electric motor including stator 28, windings 44 passing therethrough and a rotor 46 press fitted on the crankshaft 30 and having upper and lower counterweights 48 and 50, respectively.

The upper surface of main bearing housing 24 is provided with a flat thrust bearing surface 53 on which is disposed an orbiting scroll 54 having the usual spiral vane or wrap 56 on the upper surface thereof. Projecting downwardly from the lower surface of orbiting scroll 54 is a cylindrical hub having a journal bearing 58 therein and in which is rotatively disposed a drive bushing 60 having an inner bore 62 in which crank pin 32 is drivingly disposed. Crank pin 32 has a flat on one surface which drivingly engages a flat surface (not shown) formed in a portion of bore 62 to provide a radially compliant driving arrangement, such as shown in assignee's U.S. Pat. No. 4,877,382, the disclosure of which is hereby incorporated herein by reference. An Oldham coupling 63 is also provided positioned between and keyed to orbiting scroll 54 and bearing housing 24 to prevent rotational movement of orbiting scroll member 54. Oldham coupling 63 is preferably of the type disclosed in assignee's copending application Ser. No. 591,443, entitled "Oldham Coupling For Scroll Compressor" filed Oct. 1, 1990, the disclosure of which is hereby incorporated herein by reference.

A non-orbiting scroll member 64 is also provided having a wrap 66 positioned in meshing engagement with wrap 56 of scroll 54. Non-orbiting scroll 64 has a centrally disposed discharge passage 75 which communicates with an upwardly open recess 77 which in turn is in fluid communication with a discharge muffler chamber 79 defined by cap 14 and partition 22. An annular recess 81 is also formed in non-orbiting scroll 64 within which is disposed a seal assembly 83. Recesses 77 and 81 and seal assembly 83 cooperate to define axial pressure biasing chambers which receive pressurized fluid being compressed by wraps 56 and 66 so as to exert an axial biasing force on non-orbiting scroll member 64 to thereby urge the tips of respective wraps 56, 66 into sealing engagement with the opposed end plate surfaces. Seal assembly 83 is preferably of the type described in greater detail in U.S. Pat. No. 5,156,539, the disclosure of which is hereby incorporated herein by reference. Scroll member 64 is designed to be mounted to bearing housing 24 in a suitable manner such as disclosed in the aforementioned U.S. Pat. No. 4,877,382 or U.S. Pat. No. 5,102,316, the disclosure of which is hereby incorporated herein by reference.

Figure 5:
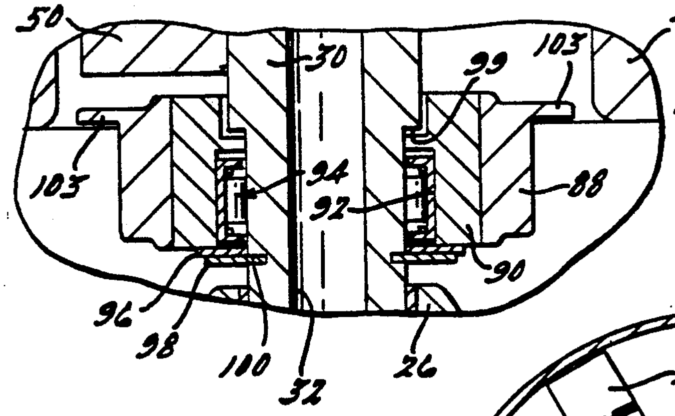
FIG. 5 is a vertical sectional view taken generally along line 5—5 in FIG. 2.
Figure 6:
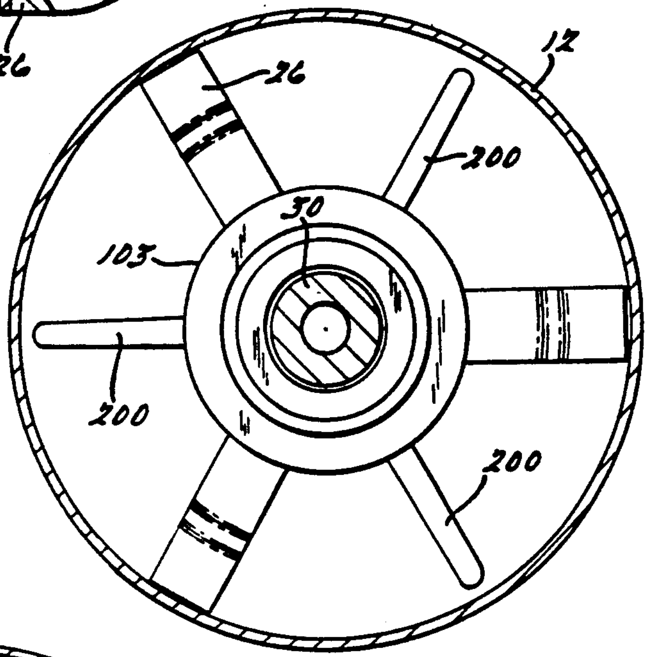
FIG. 6 is a view similar to FIG. 2 illustrating a three-bladed version of the paddle of the fluid brake of the present invention.

The fluid brake of the present invention comprises a paddle 84, which can be an aluminum casting, having two diametrically opposite relatively flat blades 86 integrally formed with a hub 88, and having a hardened insert 90 imbedded therein which defines a center bore 92 into which is press fit a one-way clutch assembly 94. Shaft 30 is disposed in bore 92 and paddle 84 is supported on shaft 30 by a washer 96 which is supported by a snap ring 98 disposed in an annular groove 100 in shaft 30. Upward movement of the paddle on shaft 30 is limited by a shoulder 99 on the latter. Blades 86 are disposed below the normal level of oil in the sump, indicated at 102, between the lower end of winding 44 and lower bearing housing 26. As can be best seen in FIG. 5, hub 88 has a relatively short integral horizontal flange 103 extending radially outwardly from the upper periphery thereof between blades 86, which can act as a rotor shield of the type described in the aforementioned U.S. Pat. No. 5,064,356.

Figure 3:
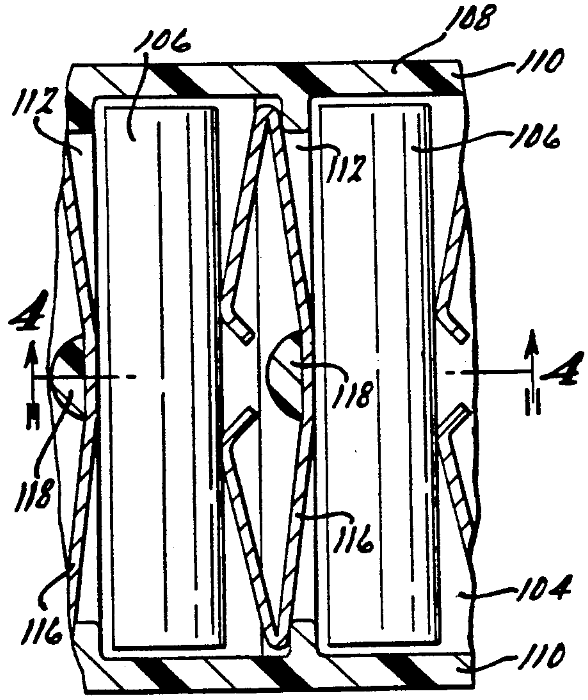
FIG. 3 is an enlarged view of the one-way clutch mechanism of the invention illustrated in FIG. 1, looking radially outwardly in a direction through the plane of the drawing, and showing the mechanism in driving mode.
Figure 4:
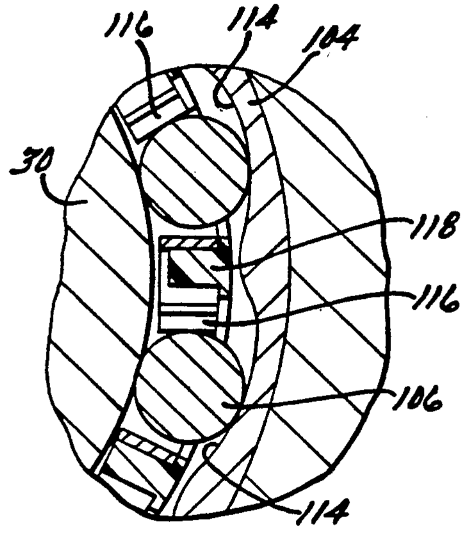
FIG. 4 is an enlarged sectional view taken generally along line 4—4 in FIG. 3.

As best seen with reference to FIGS. 1, 3 and 4, clutch assembly 94 includes an outer housing 104, formed of steel or the like, within which are disposed a plurality of circumferentially spaced roller pins 106 rotatably supported within axially extending cavities defined by housing 104, which is channel-shaped in cross-section, and a plastic retainer 108 comprising spaced annular end portions 110 and integral axially extending portions 112 disposed between each roller 106. Each of the cavities is substantially identical, extending over the full length of each pin 106, and includes a rear wall 114 formed in housing 104 which tapers in a circumferential direction from one end wherein it is positioned at a maximum radial distance from the axis of rotation of shaft 30 to the opposite end wherein it is positioned at a minimum radial distance therefrom. At the maximum radial distance location the distance between shaft 30 and wall 114 will be equal to or slightly greater than the diameter of each pin 106 and at the minimum radial distance location it is less than the diameter of each pin. A generally C-shaped leaf spring 116 is also disposed within each cavity which operates to urge each pin 106 toward the radially shallower end thereof. Each spring 116 is supported by a radial projection 118 on each portion 112 of retainer 108.

Thus, as best shown in FIG. 4, rotation of shaft 30 in a counterclockwise direction looking downwardly will act to move each pin 106 against its spring 116 and into an area of its cavity wherein pin 106 may rotate freely under action of shaft 30, with no drive forces being transmitted from the shaft to the paddle. However, should the direction of rotation of shaft 30 be reversed, the action of springs 116 and shaft 30 will cause each pin 106 to move into a shallower area of its cavity and thereby causing shaft 30 to operatively drive paddle 84. The very high viscous friction between blades 86 and the oil in the sump as blades 86 attempt to displace the lubricating oil in the sump provides a substantial drag force (torque) on shaft 30 thereby quickly stopping the reverse rotation thereof, which in turn quickly impedes movement of the orbiting scroll member 54 in a reverse direction. This drag force (torque) is increased due to the blades 86 trying to displace the sump oil. In a presently preferred embodiment, it has been found that a Torrington Model RC-162110-FS, or equivalent, clutch assembly has provided satisfactory performance.

Figure 7:
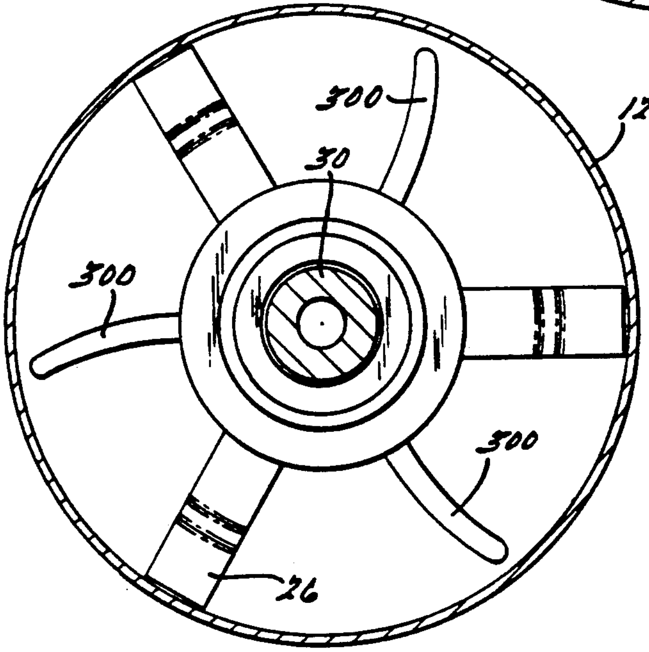
FIG. 7 is a view similar to FIG. 6 but showing a fluid brake utilizing curved paddle blades.
Figure 8:
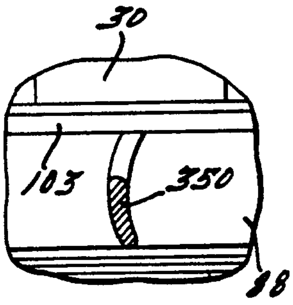
FIG. 8 is a view similar to FIG. 6 illustrating in transverse section a variation of the fluid brake blades of FIG. 2 in which they are provided with a curvature in cross-section.

Variations of the paddle are illustrated in FIGS. 6 through 16. For example, in FIG. 6 there is illustrated a paddle which is in all respects identical to paddle 84 except that it has three relatively flat blades 200 rather than merely two blades 86. In FIG. 7 there is illustrated a three bladed paddle similar to that of FIG. 6 except that in the FIG. 7 version each blade 300 is slightly curved in the plane shown to thereby alter the braking characteristics of the device. In FIG. 8 there is illustrated a paddle which can have any number of blades but which instead of being flat in cross-section is curved in the manner shown at 350.

Figure 9:
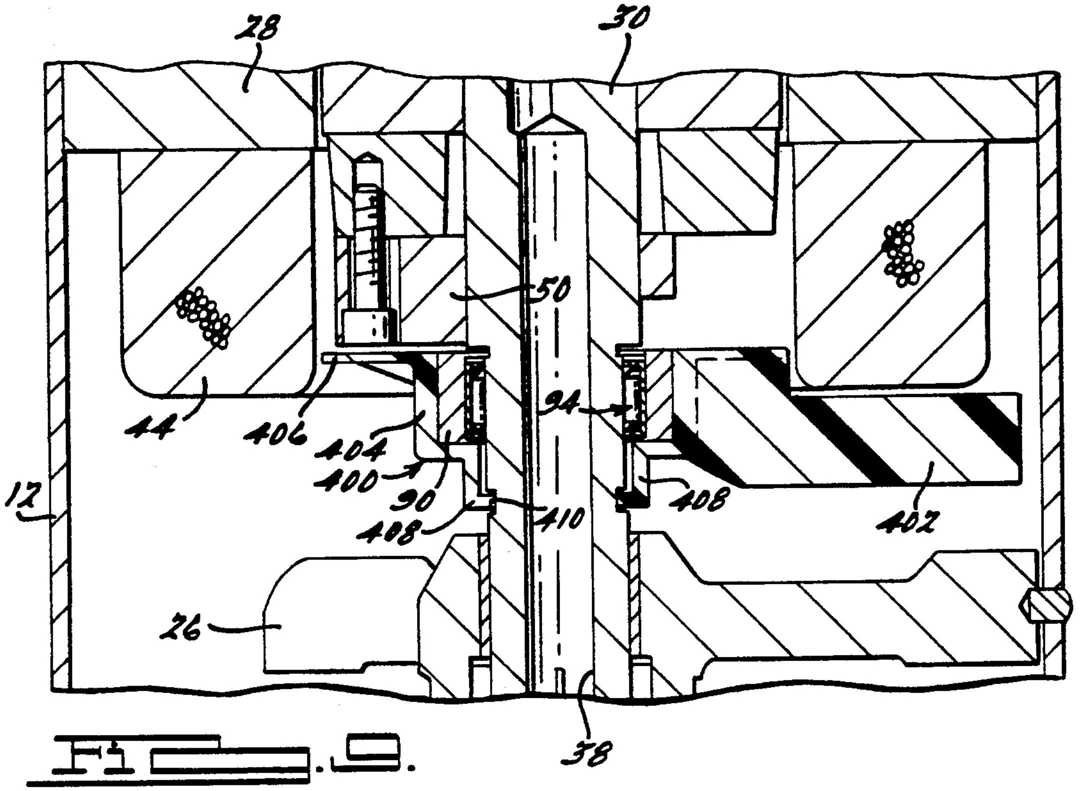
FIG. 9 is a fragmentary sectional view similar to FIG. 1 illustrating an alternative mounting technique for the fluid brake of the present invention and also incorporating a more distinct motor rotor shield.
Figure 10:
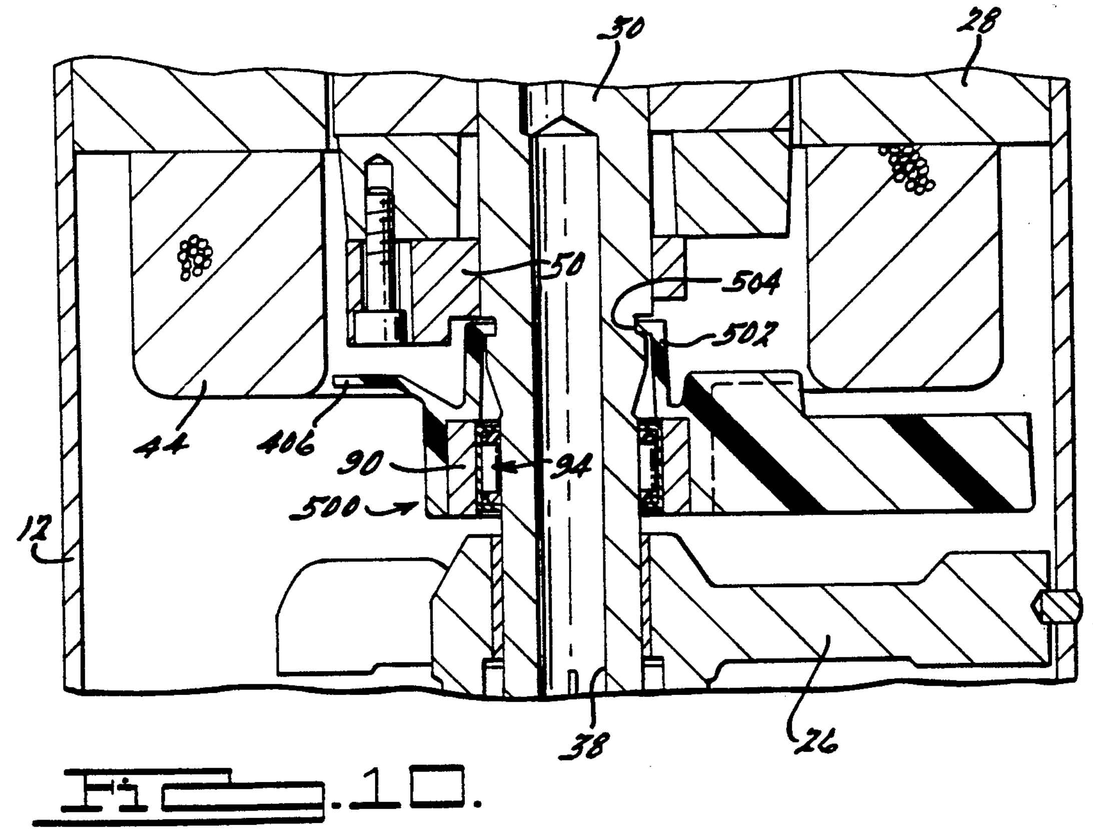
FIG. 10 is a view similar to FIG. 9 showing yet another mounting technique.

In FIGS. 9 and 10 there are illustrated two additional alternative embodiments of the paddle in which the paddle is formed from a polymeric material, such as glass filled nylon, and in which the paddle is affixed to the shaft by integral fingers. With reference to FIG. 9, there is illustrated a paddle 400 having two or more relatively flat plates 402 integrally formed with a hub 404 having extending outwardly from the upper periphery thereof a generally circular flange 406 which can act as a rotor shield as described above. Paddle 400 is provided with a steel insert 90 and a one-way clutch assembly 94 in the same manner and for the same function as in preceding embodiments. Note that FIG. 9 is not a 180 degree section and that on the right-hand portion the section line passes through the paddle, whereas in the left-hand portion the section line passes through a non-blade portion of the paddle. Extending downwardly and inwardly from the center of hub 404 are a plurality (e.g., eight or more) integrally formed resilient fingers 408 which are disposed in a groove 410 in shaft 30. The interaction of fingers 408 and groove 410 serves to axially locate the paddle on the shaft.

The variant of FIG. 10 is very similar to that of FIG. 9 except that the paddle, indicated at 500, comprises a plurality of upwardly extending fingers 502 disposed in a groove 504 on shaft 30 for the purpose of retaining the paddle in axial position. In addition, flange 406, which acts as the rotor shield, has a slightly different configuration than that in the preceding embodiment, however, it is intended to function in substantially the same manner, which is in the manner disclosed and described in the aforementioned U.S. Pat. No. 5,064,356.

Figure 11:
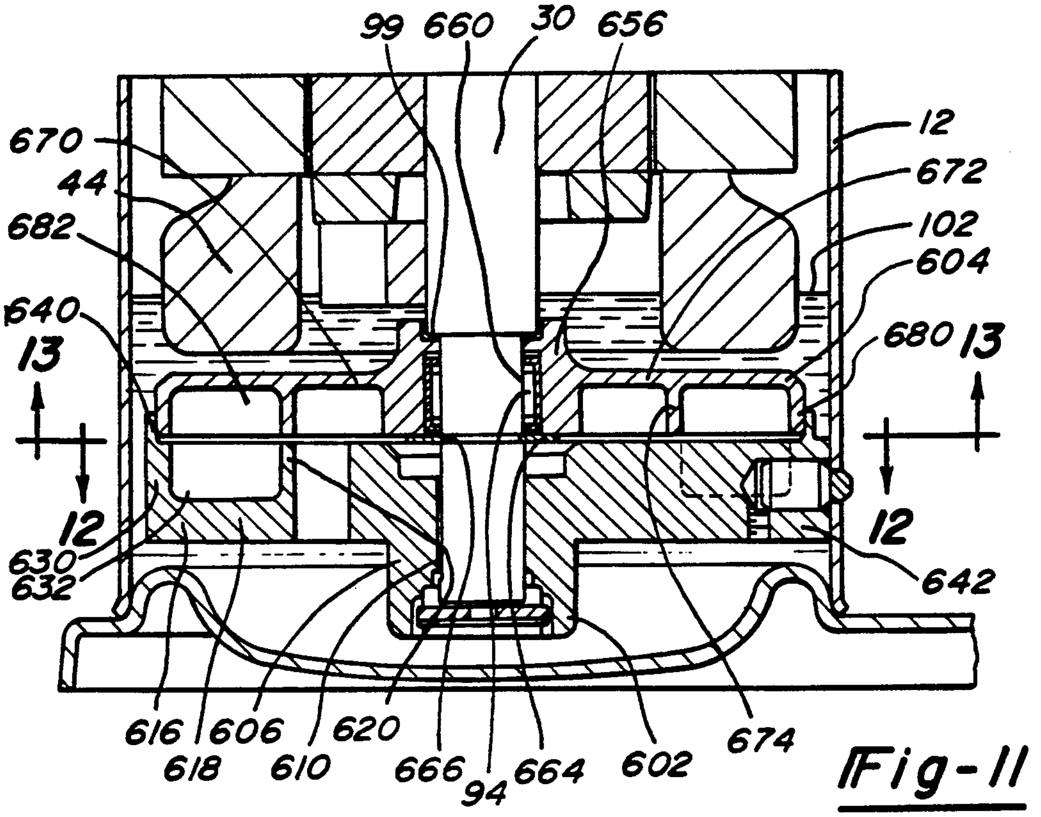
FIG. 11 is fragmentary vertical sectional view similar to FIG. 1 through the center lower portion of a scroll type refrigeration compressor incorporating a fluid brake in accordance with another embodiment of the present invention.
Figure 12:
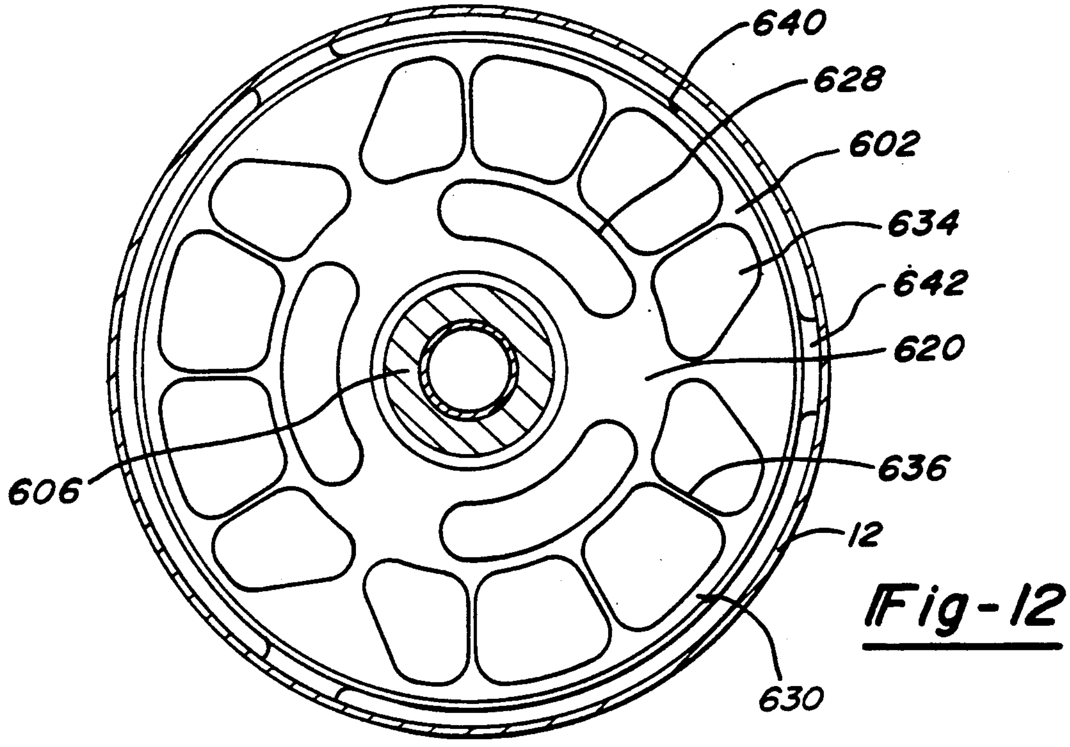
FIG. 12 is a horizontal sectional view taken generally along line 12—12 of FIG. 11.
Figure 13:
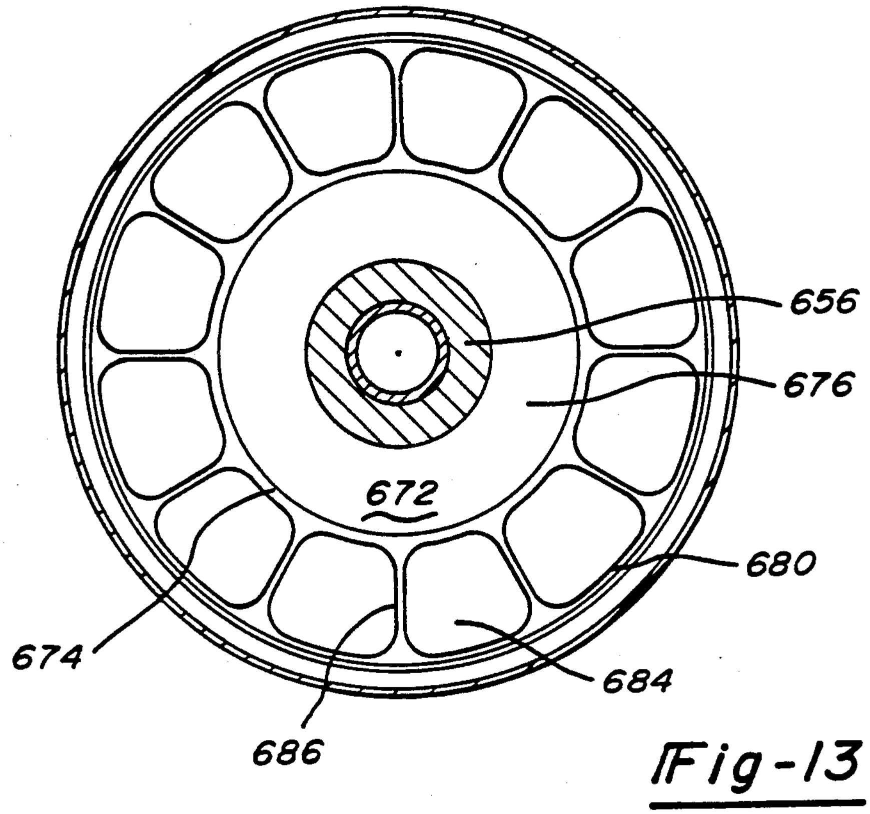
FIG. 13 is a horizontal sectional view taken generally along line 13—13 of FIG. 11.

Referring to FIGS. 11 through 13, there is illustrated an additional alternative embodiment of the paddle in which the fluid brake is of a two piece construction, one piece being stationary the other rotating with crankshaft 30. While the present embodiment will be described as having an upper rotating paddle and a lower stationary housing, it is within the scope of the present invention to have only the upper rotating paddle.

The fluid brake of this embodiment comprises a lower stationary housing 602 and an upper rotating paddle 604 both of which can be an aluminum casting. Lower housing 602 has an integrally formed hub 606 which defines a center bore 610. Shaft 30 is rotatably journaled in center bore 610. Extending from hub 606 is an annular body 616. Annular body 616 comprises a flat disk-like section 618 extending radially outward from hub 606 and a first circular ring 620 disposed between hub 606 and the outer edge of disk-like section 618 and extending generally perpendicular to disk-like section 618. Extending through the portion of disk-like section 618 and first circular ring 620 are a plurality (three in FIG. 12) of apertures 628 which provide for movement of oil around and through lower housing 602 and upper paddle 604.

Disposed along the outer edge of disk-like section 618 is a second circular ring 630 which also extends generally perpendicular to disk-like section 618 in the same direction as first circular ring 620. First circular ring 620, disk-like section 618 and second circular ring 630 form a second generally annular cavity 632. Cavity 632 is separated into a plurality of smaller cavities 634 by a plurality of radially extending vanes 636. Vanes 636 are disposed below the normal level of oil in the sump, indicated at 102. Extending axially from the outside edge of second circular ring 630 is a third circular ring 640 which will be used to mate with upper paddle 604 as will be described later herein. Extending radially from second circular ring 630 are a plurality (three in FIG. 12) of bosses 642 which are used to locate and secure lower housing 602 to hermetic shell 12 by means known well in the art.

Upper paddle 604 has an integrally formed hub 656 which defines a center bore 660 into which is pressed one-way clutch assembly 94. Shaft 30 is disposed in bore 660 and upper paddle 604 is supported on shaft 30 by a snap ring 664 disposed in an annular groove 666 in shaft 30. Upward movement of upper paddle 604 on shaft 30 is limited by shoulder 99 on shaft 30.

Extending from hub 656 in annular body 670. Annular body 670 comprises a flat disk-like section 672 extending radially out from hub 656 and a first circular ring 674 disposed between hub 656 and the outer edge of disk-like section 672 and extending generally perpendicular to disk-like section 672. Hub 656, disk-like section 672 and first circular ring 674 form a first generally annular cavity 676. Disposed along the outer edge of disk-like section 672 is a second circular ring 680 which also extends generally perpendicular to disk-like section 672 in the same direction as first circular ring 674. First circular ring 674, disk-like section 672 and second circular ring 680 form a second generally annular cavity 682. Cavity 682 is separated into a plurality of smaller cavities 684 by a plurality of radially extending blades 686. Blades 686 are disposed below the normal level of oil in the sump, indicated at 102, between the lower end of winding 44 and lower housing 602. Upper paddle 604 is positioned on shaft 30 by snap ring 664 such that second circular ring 680 is nested within third circular ring 640 of lower housing 602 as shown in FIG. 11. As can be best seen in FIG. 11, flat disk-like section 672 can act as a rotor shield similar to the type described in the aforementioned U.S. Pat. No. 5,064,356.

Clutch 94 is identical to that described above for FIGS. 1, 3, and 4. Thus, similar to the embodiment shown in FIG. 1, rotation of shaft 30 in a counterclockwise direction looking downward will act to move each pin 106 against its spring 116 and into an area of its cavity wherein pin 106 may rotate freely under action of shaft 30, with no drive forces being transmitted from shaft 30 to upper paddle 604. However, should the direction of rotation of shaft 30 be reversed, with action of springs 116 and shaft 30 will cause each pin 106 to move into a shallower area of its cavity and thereby exert a wedging action between wall 114 and the outer surface of shaft 30 thereby causing shaft 30 to operatively drive upper paddle 604. Blades 686 of upper paddle 604 impart angular momentum to the compressor lubricating oil located in the bottom of shell 12. Centrifugal force throws the oil to the outside diameter of upper paddle 604 where it is directed into the stationary lower housing 602. Vanes 636 of lower housing 602 react against the angular momentum of the oil removing the angular momentum. The oil is then directed back into upper paddle 604 such that upper paddle 604 can again impart angular momentum to the lubricating oil. This continuous circulating of the lubricating oil between upper paddle 604 and lower housing 602 continues as long as shaft 30 is being driven in a reverse or clockwise direction. This torque on shaft 30 caused by this continuous movement of oil thereby quickly stops the reverse rotation of shaft 30, which in turn quickly impedes movement of the orbiting scroll member 54 in a reverse direction. Vanes 636 of lower housing 602 may also be shaped to impart angular momentum opposite to the direction of rotation of upper paddle 604 in order to gain additional change in angular momentum across upper paddle 604.

Figure 14:
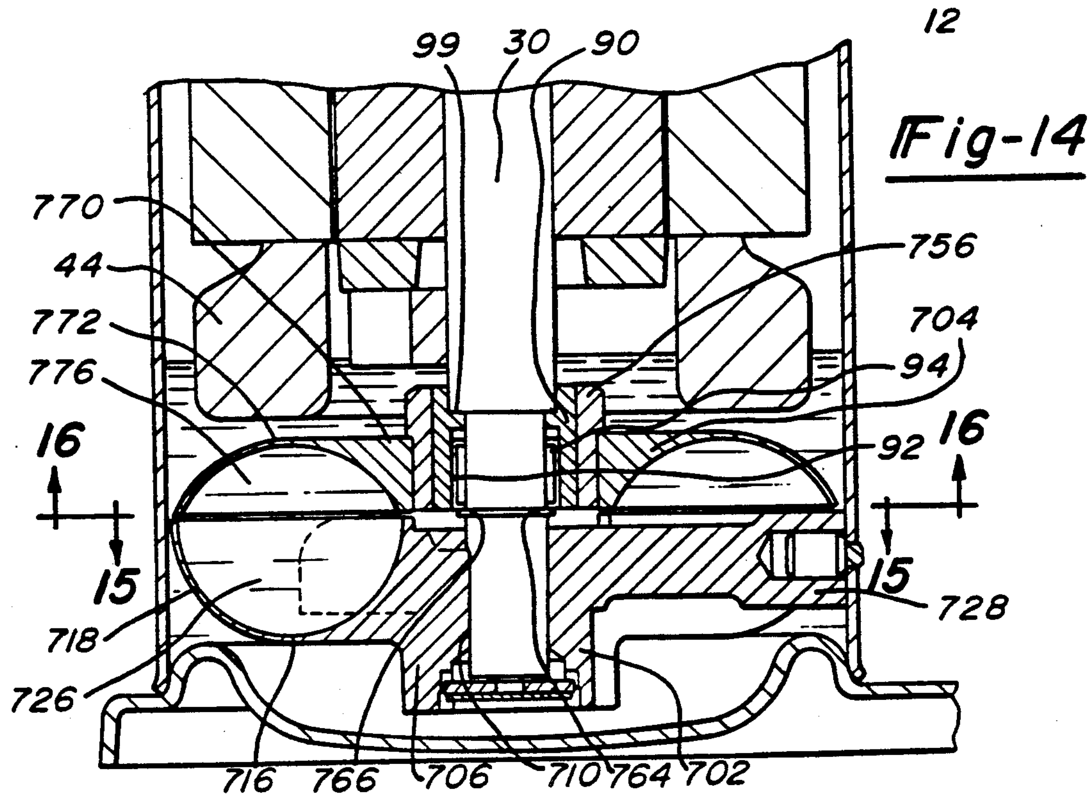
FIG. 14 is a fragmentary sectional view similar to FIG. 1 through the center lower portion of a scroll type refrigeration compressor incorporating a fluid brake in accordance with another embodiment of the present invention.
Figure 15:
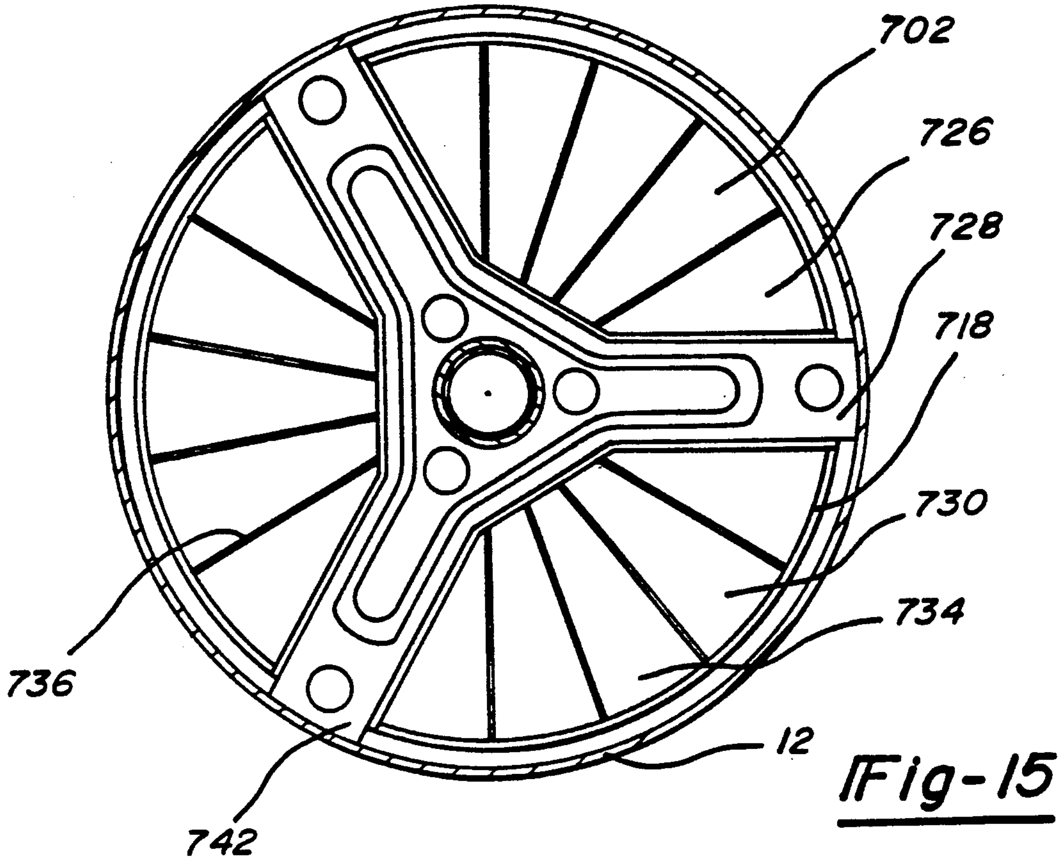
FIG. 15 is a horizontal sectional view taken generally along line 15—15 of FIG. 14.
Figure 16:
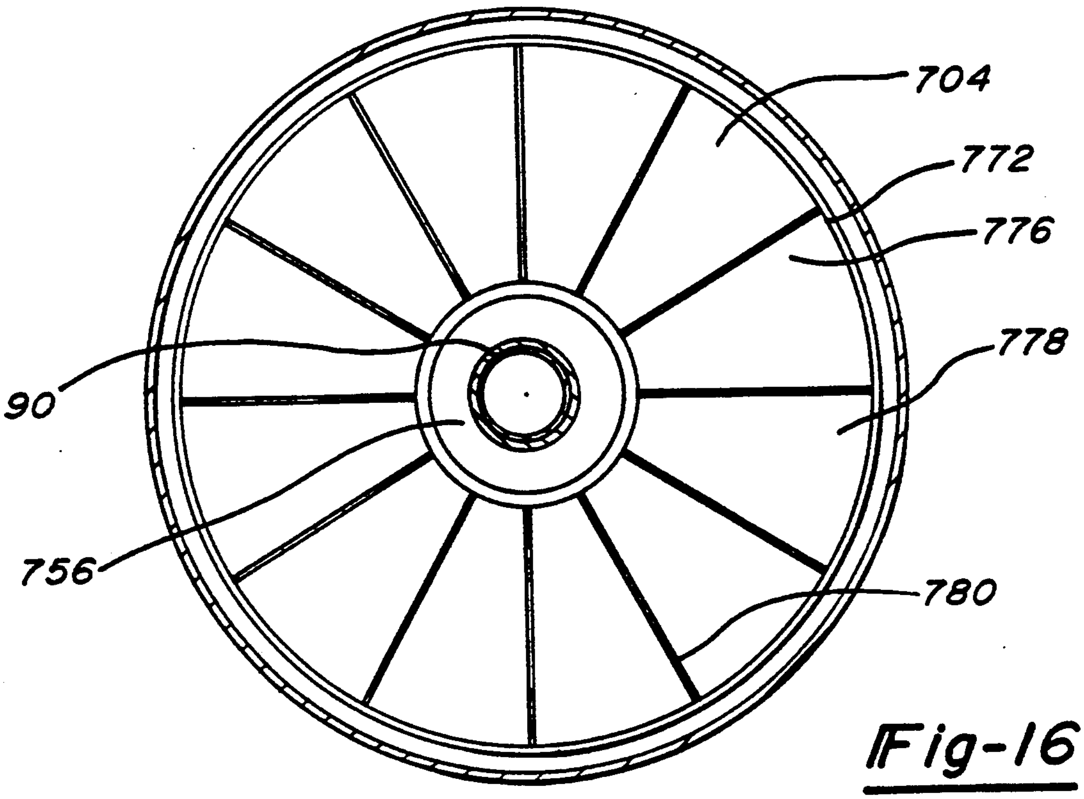
FIG. 16 is a horizontal sectional view taken generally along line 16—16 of FIG. 14.

Referring now to FIGS. 14 through 16, there is illustrated an additional alternative embodiment of the paddle in which the fluid brake is also of a two piece design. Similar to the paddle described in FIGS. 11 through 13, the embodiment shown in FIGS. 14 through 16 also has one piece being stationary and the other rotating with crankshaft 30. While the present embodiment will be described as having an upper rotating paddle and a lower stationary housing, it is well within the scope of the present invention to have only the upper rotating paddle.

The fluid brake of this embodiment comprises a lower stationary housing 702 and an upper rotating paddle 704 both of which can be aluminum casting. Lower housing 702 has an integrally formed hub 706 which defines a center bore 710. Shaft 30 is rotatably journaled in center bore 710. Extending from hub 706 is an annular body 716. Annular body 716 comprises a curved section 718 extending radially outward from hub 706. Curved section 718 forms a generally annular cavity 726. A plurality (three in FIG. 15) of circumferentially spaced ribs 728 extend radially outward from hub 706 and separate annular cavity 726 into a plurality of smaller cavities 730. Each rib 728 forms a boss 742 which is used to locate and secure lower housing 702 to hermetic shell 12 by means known well in the art. Each smaller cavity 730 is further divided into a plurality of smaller cavities 734 by a plurality of radially extending vanes 736. Vanes 736 are disposed below the normal level of oil in the sump indicated at 102.

Upper paddle 704 comprises a hub 756 having hardened insert 90 imbedded therein which defines center bore 92 into which is press fit one-way clutch assembly 94. Shaft 30 is disposed in bore 92 and upper paddle 704 is supported on shaft 30 by a snap ring 764 disposed in an annular groove 766 in shaft 30. Upward movement of upper paddle 704 on shaft 30 is limited by shoulder 99 on shaft 30.

Extending from hub 756 is an annular body 770. Annular body 770 can be an integral part of hub 756 or they can be separate pieces press fit together as shown in FIG. 14. Annular body 770 comprises a curved section 772 extending radially outward from hub 756. Curved section 772 forms a generally annular cavity 776. Cavity 776 is separated into a plurality of smaller cavities 778 by a plurality of radially extending blades 780. Blades 780 are disposed below the normal level of oil in the sump, indicated at 102, between the lower end of winding 44 and lower housing 702. As can be best seen in FIG. 14, upper paddle 704 can act as a rotor shield similar to the type described in the aforementioned U.S. Pat. No. 5,064,356.

Clutch 94 is identical to that described above for FIGS. 1, 3 and 4. The operation of this embodiment is identical to the operation of the embodiment described in FIGS. 11 through 13.

While it will be apparent that the preferred embodiments of the invention are well calculated to provide the advantages and features above stated, it will be appreciated that the invention is susceptible to modification, variation and change without departing from the proper scope or fair meaning of the subjoined claims.

What is claimed is:

1. A powered work producing apparatus requiring lubrication and having direction drive control, comprising:

(a) an enclosure having an oil reservoir, said oil reservoir containing a quantity of lubricating oil;

(b) a powered mechanism for performing work disposed in said enclosure;

(c) motor means including a drive shaft coupled to said mechanism for operatively driving same;

(d) means for supplying said lubricating oil from said oil reservoir to said powered work producing apparatus for effecting lubrication of said apparatus;

(e) a paddle disposed in said lubricating oil for rotation therein, said paddle having a plurality of blades orientated such that rotation of said paddle within said lubricating oil is resisted by said plurality of blades imparting angular momentum to said lubricating oil; and (f) one-way drive means operatively connecting said drive shaft to said paddle, whereby undesirable rotation of said drive shaft in one direction causes said paddle to be driven by said drive shaft, said paddle resisting said undesirable rotation of said drive shaft by imparting angular momentum to said lubricating oil, said one-way drive means permitting free rotation of said drive shaft in the opposite direction.

2. A rotary compressor requiring lubrication, comprising:

(a) an enclosure having an oil reservoir, said oil reservoir containing a quantity of lubricating oil;

(b) rotary compressor means disposed in said enclosure;

(c) motor means including a rotor driven shaft coupled to said compressor means for operatively driving same;

(d) means for supplying said lubricating oil from said oil reservoir to said rotary compressor for effecting lubrication of said apparatus;

(e) a counterweight on the lower end of said rotor;

(f) a paddle disposed in said lubricating oil for rotation therein, said paddle having a plurality of blades oriented such that rotation of said paddle within said lubricating oil is resisted by said plurality of blades imparting angular momentum to said lubricating oil;

(g) a shield on said paddle for controlling oil flow around the lower end of said rotor and said crank shaft; and (h) one-way drive means operatively connecting said rotor driven shaft to said paddle, whereby undesirable rotation of said rotor driven shaft in one direction causes said paddle to be driven by said rotor driven shaft, said paddle resisting said undesirable rotation of said rotor driven shaft by imparting angular momentum to said lubricating oil, said one-way drive means permitting free rotation of said rotor driven shaft in the opposite direction.

3. A scroll compressor requiring lubrication, comprising:

(a) an enclosure having an oil reservoir, said oil reservoir containing a quantity of lubricating oil;

(b) scroll compressor means disposed in said enclosure;

(c) motor drive means including a drive shaft coupled to said compressor means for operatively driving same;

(d) means for supplying said lubricating oil from said oil reservoir to said scroll compressor for effecting lubrication of said apparatus;

(e) a paddle disposed in said lubricating oil, said paddle having a plurality of blades orientated such that rotation of said paddle within said lubricating oil is resisted by said plurality of blades imparting angular momentum to said lubricating oil; and (f) one-way drive means operatively connecting said drive shaft to said paddle, whereby undesirable rotation of said drive shaft in one direction causes said paddle to be driven by said drive shaft, said paddle resisting said undesirable rotation of said drive shaft by imparting angular momentum to said lubricating oil, said one-way drive means permitting free rotation of said drive shaft in the opposite direction.

4. A scroll compressor as claimed in claim 3 wherein said one-way drive means is a one-way clutch.

5. A scroll compressor as claimed in claim 3 wherein said drive means is positioned in surrounding relationship to said drive shaft.

6. A scroll compressor as claimed in claim 3 wherein said plurality of blades are disposed in said oil reservoir.

7. A scroll compressor as claimed in claim 6 wherein said paddle has two blades disposed in said oil reservoir.

8. A scroll compressor as claimed in claim 6 wherein said paddle has more than two blades disposed in said oil reservoir.

9. A scroll compressor as claimed in claim 6 wherein said blades are curved in the plane of movement thereof.

10. A scroll compressor as claimed in claim 6 wherein said blades are curved in cross-section.

11. A scroll compressor as claimed in claim 3 further comprising a relatively hard metal insert centrally disposed in said paddle and defining a bore coincident with the axis of rotation of said paddle.

12. A scroll compressor as claimed in claim 11 wherein said one-way drive means is mounted in said bore.

13. A scroll compressor as claimed in claim 11 wherein said paddle is formed of aluminum.

14. A scroll compressor as claimed in claim 11 wherein said paddle is formed of a polymeric material.

15. A scroll compressor as claimed in claim 3 wherein said drive means is non-rotatively affixed to said paddle.

16. A scroll compressor as claimed in claim 3 wherein said paddle is supported on an annular shoulder on said drive shaft.

17. A scroll compressor as claimed in claim 16 wherein said annular shoulder is defined by a washer surrounding said drive shaft.

18. A scroll compressor as claimed in claim 17 wherein said washer is supported on said drive shaft by snap ring means.

19. A scroll compressor as claimed in claim 16 wherein said shoulder is defined by an annular groove on said drive shaft.

20. A scroll compressor as claimed in claim 19 further comprising a plurality of fingers on said paddle disposed in said groove to retain said paddle against axial movement with respect to said drive shaft.

21. A scroll compressor as claimed in claim 20 wherein said fingers are integrally formed with said paddle.

22. A scroll compressor as claimed in claim 21 wherein said fingers extend upwardly from said paddle.

23. A scroll compressor as claimed in claim 21 wherein said fingers extend downwardly from said paddle.

24. A scroll compressor as claimed in claim 3 wherein said paddle comprises a first housing defining a first annular cavity, said plurality of blades being disposed within said first annular cavity.

25. A scroll compressor as claimed in claim 24 wherein said one-way drive means is mounted in said first housing.

26. A scroll compressor as claimed in claim 24 further comprising a second housing fixedly secured to said enclosure, said second housing having a plurality of vanes, said plurality of vanes positioned to resist angular momentum imparted to said lubricating oil by said plurality of blades of said first housing when said first housing rotates within said lubricating oil.

27. A scroll compressor as claimed in claim 26 wherein said drive shaft is journaled within said second housing.

28. A scroll compressor as claimed in claim 26 wherein said second housing defines a second annular cavity.

29. A scroll compressor as claimed in claim 28 wherein said plurality of vanes are disposed within said second annular cavity.

30. A scroll compressor requiring lubrication, comprising:

(a) an enclosure having an oil reservoir, said oil reservoir containing a quantity of lubricating oil;

(b) scroll compressor means disposed in said enclosure;

(c) motor drive means including a drive shaft coupled to said compressor means for operatively driving same;

(d) means for supplying said lubricating oil from said oil reservoir to said scroll compressor for effecting lubrication of said apparatus;

(e) a paddle disposed in said lubricating oil, said paddle comprising:

a first housing defining a first annular cavity;

a plurality of blades disposed within said first annular cavity and oriented such that rotation of said paddle within said lubricating oil is resisted by said plurality of blades imparting angular momentum to said lubricating oil;

a second housing fixedly secured to said enclosure and defining a second annular cavity; and a plurality of vanes disposed within said second annular cavity and positioned to resist angular momentum imparted to said lubricating oil by said plurality of blades of said first housing when said first housing rotates within said lubricating oil; and (f) one-way drive means operatively connecting said drive shaft to said paddle, whereby undesirable rotation of said drive shaft in one direction causes said paddle to be driven by said drive shaft, said paddle resisting said undesirable rotation of said drive shaft by imparting angular momentum to said lubricating oil, said one-way drive means permitting free rotation of said drive shaft in the opposite direction.

31. A scroll compressor requiring lubrication, comprising:

(a) an enclosure having an oil reservoir, said oil reservoir containing a quantity of lubricating oil;

(b) scroll compressor means disposed in said enclosure;

(c) motor drive means including a drive shaft coupled to said compressor means for operatively driving same;

(d) means for supplying said lubricating oil from said oil reservoir to said scroll compressor for effecting lubrication of said apparatus;

(e) a paddle disposed in said lubricating oil, said paddle comprising:

a first housing defining a first annular cavity, said first housing having a curved exterior surface;

a plurality of blades disposed within said first annular cavity and oriented such that rotation of said paddle within said lubricating oil is resisted by said plurality of blades imparting angular momentum to said lubricating oil;

a second housing fixedly secured to said enclosure and defining a second annular cavity, said second housing having a curved exterior surface; and a plurality of vanes disposed within said second annular cavity and positioned to resist angular momentum imparted to said lubricating oil by said plurality of blades of said first housing when said first housing rotates within said lubricating oil; and (f) one-way drive means operatively connecting said drive shaft to said paddle, whereby undesirable rotation of said drive shaft in one direction causes said paddle to be driven by said drive shaft, said paddle resisting said undesirable rotation of said drive shaft by imparting angular momentum to said lubricating oil, said one-way drive means permitting free rotation of said drive shaft in the opposite direction.

* * * * *

UNITED STATES PATENT AND TRADEMARK OFFICE

CERTIFICATE OF CORRECTION

PATENT NO. : 5,320,507

DATED : June 14, 1994

INVENTOR(S) : Kenneth J. Monnier; Francis M. Simpson

It is certified that error appears in the above-indentified patent and that said Letters Patent is hereby corrected as shown below:

ON THE TITLE PAGE:

Item [56] , under U.S. Patent Documents, reference 4,836,347, "Johnson et al" should be -- Johnston et al --.

Column 3, line 40, begin new paragraph with -- FIG. 15 --.

Column 7, line 19, "in" should be -- is --.

Column 9, line 43, "apparatus" should be -- compressor --.

Column 11, line 45, "apparatus" should be -- compressor --.

Column 12, line 27, "apparatus" should be -- compressor --.

Signed and Sealed this

First Day of November, 1994

*Attest:*

Bruce Lehman

BRUCE LEHMAN

*Attesting Officer*

*Commissioner of Patents and Trademarks*